INVENTOR.
HERBERT B. HINDIN
HAROLD S. HOWE
BY James J. Long
AGENT

2,939,502
PNEUMATIC TIRE

Herbert B. Hindin, St. Clair Shores, and Harold S. Howe, Detroit, Mich., assignors to United States Rubber Company, New York, N.Y., a corporation of New Jersey Filed Oct. 28, 1954, Ser. No. 465,228

3 Claims. (Cl. 152—352)

This invention relates to an improved pneumatic tire casing, and more particularly it relates to a pneumatic tire casing characterized by an unusually low profile and flat, wide tread.

One object of the invention is to provide a pneumatic tire that has less weight and uses less material, and also takes up less space, than conventional tires of equivalent load-carrying capacity.

Another object is to make feasible a pneumatic tire which presents a greater tread area of contact with the road, thereby affording better traction and reduced wear.

Still a further object of the invention is the provision of a pneumatic tire having greater resistance to "peaking" and tread separation under the influence of centrifugal forces developed at high speeds.

It is a further object of the invention to provide a pneumatic tire casing which deflects less under a given load.

Additional objects and advantages of the invention will be made manifest in the following detailed description, which is intended to be read with reference to the accompanying drawing, wherein.

Figure 1:
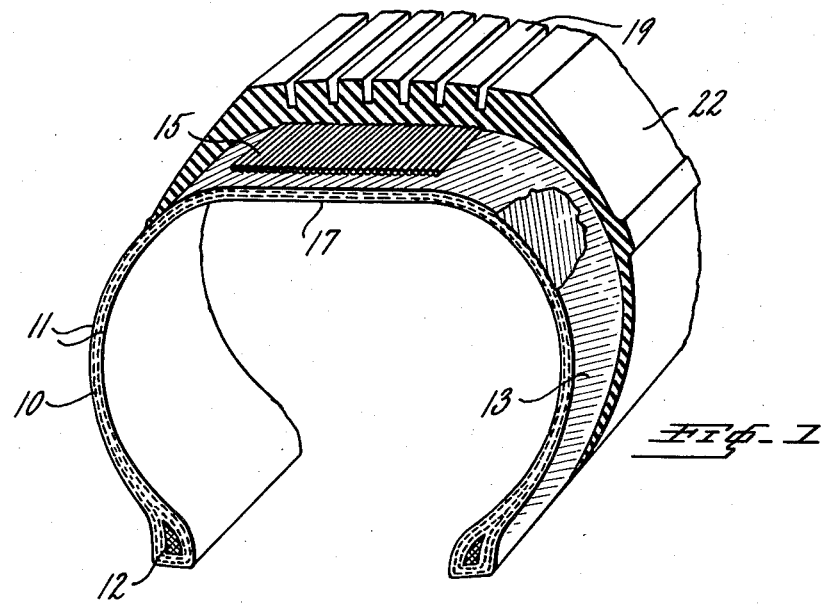
Fig. 1 is a fragmentary perspective view, with parts broken away, of a pneumatic tire of the invention.

Referring to Fig. 1, the pneumatic tire shown therein is comprised of an internal reinforcing carcass 10 made of a plurality of plies 11 of rubberized tire fabric, which are wrapped around inextensible bead members 12 located at the rim areas of the tire. Each of the carcass plies is made up of rubberized cord fabric, comprised of a plurality of tire cords 13 disposed side by side to form the cord fabric, and usually treated with an adhesive substance, after which the cord fabric is coated on each side with a thin layer of rubber carcass stock. In this form of the invention, the carcass plies are so arranged that the cords 13 run on a bias from one bead of the tire to the other, making an angle of some 40° (and usually within the range of from 30° to 55°) with a circumferential center line passing along the crown of the tire. Alternate plies are arranged so that the cords run in opposite directions. The cords 13 are usually made of textile material, such as cotton, rayon or, preferably, nylon, but wire may also be used for this purpose.

Disposed on the upper crown surface of the carcass is a layer 15 of strong wire cable wound circumferentially around the carcass for a plurality of turns, so as to form a positive restraining element on the outer surface of the carcass. For this purpose the wire cable is suitably formed first into a band, as by winding the cable on a thin band of rubber contained on a suitable collapsible form. Such band is applied to the tire carcass subsequent to the shaping of the carcass, which is initially assembled in the form of a flat band in accordance with the usual practice. As a result of the restraining action of the circumferential band of wire cable 15, the crown area 17 of the carcass is maintained in a flat condition, even when the tire is inflated. A rubber tread 19 is superimposed on the outer surface of the wire cable band, and rubber sidewall portions are similarly assembled over the sidewall areas of the carcass. The rubber tread portion is so shaped as to conform essentially to the flat contour of the carcass and wire cable band. By "flat contour" is meant that the inextensible wire restraining members are disposed in a single cylindrical surface and restrain the crown area of the carcass to a single cylindrical surface parallel to and coextensive in width to the width of the surface of the layer of inextensible wire restraining members.

The width of the circumferential restraining band is such that there is no tendency, when the tire is inflated, to induce chafing strains at the lateral edges of the band by reason of any tendency of the sidewall or shoulder portion to curve or bulge outwardly beyond or above the plane of the band, as would be the case if the band were too narrow in a given tire. Similarly, the proportions are such that there is no tendency for the sidewall at the shoulder portion to bend sharply downwardly or inwardly at the edge of the band to cause separation at that point, as would be the case if the band were too wide for a given tire. In other words, the tire is proportioned and cured in the form or shape it naturally assumes when inflated, with the flat, restrained tread merging at its edges with the sidewalls in a smooth, gradual curve free from any reverse curvature or sharp point of inflection. The relaxed tire has essentially the same shape as the inflated tire.

Figure 2:
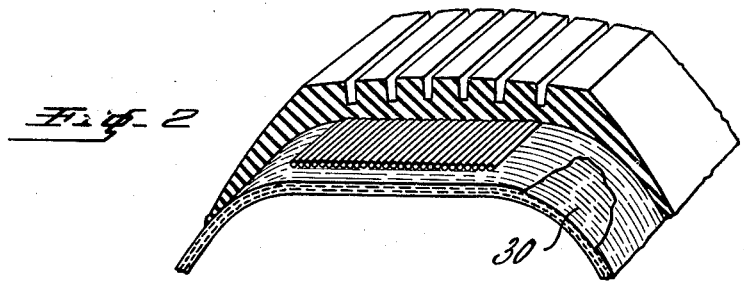
Fig. 2 is a similar view of a modification of the invention.

The modification of the invention shown in Fig. 2 is similar to that described in connection with Fig. 1, except that the cords 30 in the carcass plies in this form of the invention are disposed essentially transversely, that is, they are disposed at an angle of about 80° or more to the circumferential center line of the tire.

Figure 3:
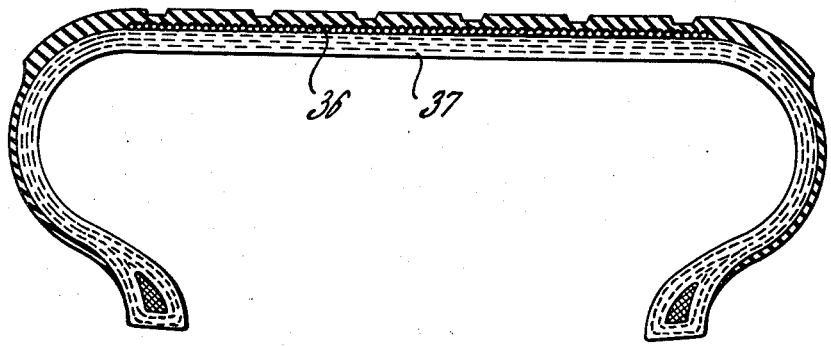
Fig. 3 is a transverse sectional view of another modification of the invention.

The modification of the invention shown in Fig. 3 represents an extreme degree of restraint imposed by a circumferentially wound steel cable 36 disposed on the upper surface of the multiply carcass 37, so as to provide an unusually wide and very low tire that is particularly adapted for use as an airplane tire. The carcass of this tire can be assembled in essentially the desired shape on a collapsible drum, and the steel cable can be wound directly on the upper crown surface of the carcass on the drum.

In all cases, the circumferential wire band is firmly adhered to the carcass rubber and to the tread rubber by a suitable rubber-to-metal adhesion process, such as is afforded by brass plating the wire. It will be observed that the layer of inextensible wire restraining members is positioned at the juncture of the carcass and the tread. The stranded wire cables comprising the band may be individually rubber coated, or they may be formed into a layer of cord fabric with a skim coating of rubber stock on one or both sides by calendering procedures known in the tire building art. A band of such fabric may be wound circumferentially around the crown of the carcass and overlapped to form a splice, or such band may be wound around for more than one turn. Two or more layers or plies of such fabric may be superimposed if desired. In all cases the cords in such breaker plies will be disposed essentially circumferentially, that is, the cord angle will be very near to 0° (i.e., in no case greater than about 20°), so that the cords are enabled to impose the necessary severe circumferential restraint.

Because it is feasible to make the tread of the present tire unusually wide and flat, it presents a greater area of contact with the road, thereby minimizing wear and improving traction. Thus, the form of the invention illustrated in Fig. 1 has an essentially rectangular footprint, that is, when this tire is pressed against the road under normal load, the area of contact is essentially a rectangle in contrast to the generally oval-shaped footprint displayed by a conventional tire of the same size. The modification of Fig. 2, embodying 90° angle fabric in the carcass, presents a unique form of footprint having a wider area of contact in the shoulder than in the crown.

It should be noted that the flat tread profile of the present tire is achieved with a tread rubber portion of essentially uniform thickness, because the underlying portion of the tire casing is itself flat. In contrast, in conventional constructions, in which the carcass is of essentially circular or definitely curved form, relative flatness can be achieved at the tread surface only by making the tread unusually thick toward the shoulder regions. Such expedient is objectionable not only from the standpoint of representing a waste of rubber, but it also makes the tire heavier than necessary, and leads to the generation of more heat, since there is more rubber to flex with each revolution of the tire, and there is less opportunity for heat to escape.

By utilizing the present construction, tires may be made much wider and, in proportion to the height, than has heretofore been practicable. Thus, the present tire is readily made two or more times as wide as it is high without difficulty. Therefore tires constructed in accordance with the present practice can be used to replace dual tires on heavy vehicles. In fact, the single-chambered tire of the invention can be made three, four, or even more times as wide as it is high, thus achieving performance characteristics that could heretofore be approximated only by resorting to complex multi-chambered constructions.

By employing a circumferentially wound inextensible band to restrain the tire as described, it is possible to vary greatly the extent of the restraint, to suit a particular use to which the tire is to be put. Thus, in passenger tires it may be desirable to impose a degree of restraint of anywhere from 5% to 50%, that is, the section height of the tire might be 5% to 50% less than the height to which the same tire would normally expand upon inflation in the absence of the essentially circumferential restraining breaker of the invention. In some instances, as in the case of airplane tires, even higher degrees of restraint, of the order of 80%, may be desirable.

The present tires take up less room than usual tires, in addition to utilizing less rubber and being lighter in weight.

Having thus described our invention, what we claim and desire to protect by Letters Patent is:

1. A pneumatic tire casing comprising a flexible carcass of rubberized cord fabric having a crown area and contiguous sidewall areas terminating in spaced bead areas containing essentially inextensible bead members, said carcass defining an interior chamber of the tire casing in which inflating air under pressure is adapted to be contained, a single layer of inextensible stranded wire restraining members circumferentially disposed around the outside crown area of said carcass in a single cylindrical surface and restraining said crown area to a single cylindrical surface parallel to and coextensive in width to the width of the surface of said layer of inextensible wire restraining members without substantially changing the inflated curvature of the remainder of said carcass, said layer of inextensible wire restraining members imposing a degree of restraint of from 5% to 80% of the section height the inflated casing would have if unrestrained, a rubber tread and sidewall overlaying said layer of inextensible wire restraining members and said carcass with said layer of inextensible wire restraining members positioned at the juncture of said carcass and said tread and adhered thereto and with said tread fully supported by rubber extending from the surface of the tread to the carcass over the full width of the tread.

2. A pneumatic tire casing comprising a flexible carcass of rubberized cord fabric having a crown area and contiguous sidewall areas terminating in spaced bead areas containing essentially inextensible bead members, a single layer of inextensible wire restraining members circumferentially disposed around the outside crown area of said carcass in a single cylindrical surface and restraining said crown area to a single cylindrical surface parallel to and coextensive in width to the width of the surface of said layer of inextensible wire restraining members without substantially changing the inflated curvature of the remainder of said carcass, a rubber tread and sidewall overlaying said layer of inextensible wire restraining members and said carcass with said layer of inextensible wire restraining members positioned at the juncture of said carcass and said tread and adhered thereto and with said tread fully supported by rubber extending from the surface of the tread to the carcass over the full width of the tread.

3. A pneumatic tire casing as defined in claim 2 wherein the cord fabric of the carcass is disposed with the cords therein forming an angle of at least 80° with respect to the circumferential center line of the tire.

References Cited in the file of this patent

UNITED STATES PATENTS

| 1,188,062 | Gammeter | June 20, 1916 |
| 1,189,223 | Albrecht | July 4, 1916 |
| 1,554,370 | Renner | Sept. 22, 1925 |
| 1,678,211 | Davidson | July 24, 1928 |
| 1,921,772 | Paull | Aug. 8, 1933 |
| 2,388,421 | Kraft | Nov. 6, 1945 |
| 2,605,201 | Howe | July 29, 1952 |
| 2,874,742 | Lugli | Feb. 24, 1959 |

FOREIGN PATENTS

| 410,031 | France | Mar. 5, 1910 |
| 508,165 | Belgium | Jan. 15, 1952 |

(Corresponding Great Britain Patent 700,435 Dec. 2, 1953)

| 1,078,882 | France | May 12, 1954 |

(Corresponding Great Britain Patent 720,150 Dec. 15, 1954)